United States Patent
Seemann et al.

(10) Patent No.: US 12,371,862 B2
(45) Date of Patent: Jul. 29, 2025

(54) SYSTEM AND METHOD FOR CONTROLLING A ROAD CONSTRUCTION PROCESS

(71) Applicant: LEICA GEOSYSTEMS AG, Heerbrugg (CH)

(72) Inventors: Jürgen Seemann, Hatten (DE); Alexander Kurz, Au (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 765 days.

(21) Appl. No.: 17/729,858

(22) Filed: Apr. 26, 2022

(65) Prior Publication Data
US 2022/0341104 A1 Oct. 27, 2022

(30) Foreign Application Priority Data
Apr. 27, 2021 (EP) .................................. 21170807

(51) Int. Cl.
*E01C 23/01* (2006.01)
*B60K 35/00* (2006.01)
(Continued)

(52) U.S. Cl.
CPC .............. *E01C 23/01* (2013.01); *B60K 35/00* (2013.01); *E01C 19/4873* (2013.01);
(Continued)

(58) Field of Classification Search
CPC ..... E01C 19/4873; E01C 23/01; B60K 38/00; B60K 38/10; B60K 38/28; B60K 38/85;
(Continued)

(56) References Cited

U.S. PATENT DOCUMENTS

| 10,494,772 | B1 | 12/2019 | Boston et al. |
| 11,242,658 | B2 * | 2/2022 | Kappel ............... E01C 19/4873 |

(Continued)

FOREIGN PATENT DOCUMENTS

| CN | 204401418 U | 6/2015 |
| CN | 110468656 A | 11/2019 |

(Continued)

OTHER PUBLICATIONS

European Search Report and Written Opinion dated Oct. 8, 2021 as received in application No. 21170807.
(Continued)

*Primary Examiner* — Raymond W Addie
(74) *Attorney, Agent, or Firm* — Maschoff Brennan (57) ABSTRACT

A system and computer-implemented method for automatically controlling a construction process of a road section, the section comprising a plurality of subsections, the construction process comprising processing a road surface material layer using a paver with a height-adjustable screed, the paver travelling along a predetermined path, the method comprising receiving construction design data comprising information about the path and about a nominal surface and a nominal layer thickness of the paved road surface material layer for a multitude of positions along the path, receiving a set of rules comprising different priorities for each of the plurality of subsections, continuously receiving position data indicating a current position of the screed, continuously receiving thickness data indicating a current layer thickness of the paved road surface material layer, calculating a height-adjustment of the screed, generating, based on the calculation, control data to adjust a height of the screed.

19 Claims, 5 Drawing Sheets

(51) Int. Cl.
  *E01C 19/48* (2006.01)
  *B60K 35/10* (2024.01)
  *B60K 35/28* (2024.01)
  *B60K 35/85* (2024.01)

(52) U.S. Cl.
  CPC .............. *B60K 35/10* (2024.01); *B60K 35/28* (2024.01); *B60K 35/85* (2024.01); *B60K 2360/11* (2024.01); *B60K 2360/16* (2024.01); *B60K 2360/589* (2024.01)

(58) Field of Classification Search
  CPC ............ B60K 2360/11; B60K 2360/16; B60K 2360/589
  USPC ...................................... 404/84.05–84.5, 118
  See application file for complete search history.

(56) References Cited

U.S. PATENT DOCUMENTS

| | | | | |
|---|---|---|---|---|
| 2005/0265782 | A1* | 12/2005 | Everett | E01C 11/24 404/19 |
| 2015/0267361 | A1* | 9/2015 | Horn | E01C 23/07 33/700 |
| 2016/0160452 | A1* | 6/2016 | Orefice | E01C 23/01 701/50 |
| 2022/0341104 | A1* | 10/2022 | Seeman | E01C 19/004 |

FOREIGN PATENT DOCUMENTS

| | | |
|---|---|---|
| CN | 111601929 A | 8/2020 |
| DE | 10025462 A1 | 12/2001 |
| DE | 10138563 | 2/2003 |
| EP | 1825064 A1 | 8/2007 |
| EP | 2025811 A1 | 2/2009 |
| EP | 2921588 B1 | 9/2015 |
| EP | 3739122 A1 | 11/2020 |
| WO | 2018/114669 A1 | 6/2018 |

OTHER PUBLICATIONS

CN Office Action dated Jan. 26, 2024 as received in Application No. 202210420365.4.

* cited by examiner

SYSTEM AND METHOD FOR CONTROLLING A ROAD CONSTRUCTION PROCESS

BACKGROUND

The present disclosure relates to a system and a computer-implemented method for controlling a construction process of a road and particularly to automatically control and adjust a height of a floating screed of an asphalt paver to influence a layer thickness of the road surface material.

Pavers such as asphalt pavers are construction machines with a characteristic finishing screed that serves for the installation of concrete or asphalt material. EP 1 825 064 discloses a road finisher comprising a vehicle and a screed or beam fixed thereon in a vertically adjustable manner for applying asphalt surfaces. The asphalt material is distributed by the vehicle along the front edge of the entire screed. When the machine advances to the prepared road bed, the screed floats over the asphalt material and levels and compacts it in order to provide a continuous asphalt surface having the desired surface profile. Screeds are produced with different screed widths and also with adjustable screed width.

It is known to control a travelling path of pavers and other road finishers by means of reference line scanning devices. A sensor scans the required direction and/or required height of a reference line, such as, for example, a tensioned wire; deviations from the required direction and/or height are corrected by a regulating means. DE 101 38 563 discloses a road finisher which automatically follows a reference line.

It is also known to measure—either directly or indirectly—a thickness of a layer of road surface material, such as asphalt or concrete, after the construction of the road to determine whether the road has been built according to specifications. For instance, such sensors may work by using ultrasonic signals. EP 2 921 588 B1 and WO 2018/114669 A1 disclose examples for such sensor systems that are mounted on a paver and measure the thickness of a layer of road surface material during the construction process.

It would be desirable to use the layer thickness information already during the construction process for adjusting the process, in order to avoid deviation from design by producing a layer that is too thin and to avoid a waste of material by producing a layer that is too thick.

SUMMARY

It is therefore an object of the present disclosure to provide a method to automatically control a layer thickness of a road surface material during construction of a road, particularly in real time.

It is another object to provide such a method that allows reducing deviations of a built road surface from design.

It is another object to provide such a method that allows reducing the use of road surface material.

It is another object to provide such a method that ensures building a road with the correct layer thickness.

It is a particular object to provide such a method, wherein a height of a screed is adjustable in real-time based on a measured layer thickness.

It is a further object to provide a system and a computer programme product for performing this method.

It is another object to provide a paver comprising such a system.

At least one of these objects is achieved by the methods and systems described herein.

A first aspect pertains to a computer-implemented method for automatically controlling a construction process of a section of a road or similar structure. The section comprises a plurality of subsections, and the construction process comprises processing a road surface material layer comprising concrete or asphalt material using a paver with a height-adjustable screed, the paver travelling along a predetermined path. The method comprises receiving construction design data comprising information about said path and about a nominal surface and a nominal layer thickness of the paved road surface material layer for a multitude of positions along the path, the multitude of positions comprising at least one position in each of the subsections;

receiving a set of rules comprising different priorities for each of the plurality of subsections, wherein the different priorities comprise at least one of a priority of the nominal surface over the nominal layer thickness, and a priority of the nominal layer thickness over the nominal surface;

continuously receiving position data indicating a current position of the screed, including indicating a position of the screed in a present subsection of the plurality of subsections;

continuously receiving thickness data indicating a current layer thickness of the paved road surface material layer;

calculating, based on the road construction design data for the current position, on the current layer thickness and on one or more priorities for the present subsection, a height-adjustment of the screed;

generating, based on the calculation, control data to adjust a height of the screed; and providing the control data to a machine control unit of the paver.

According to one embodiment of the method, the set of rules comprises one or more deviation rules related to a deviation of the paved road surface material layer from the nominal surface and/or from the nominal layer thickness, and the deviation rules at least define requirements for an allowed deviation and a maximum extent of the deviation. In a particular embodiment, the deviation rules comprise one or more thresholds related to a maximum layer thickness of the paved road surface material layer as requirements for an allowed deviation.

According to another embodiment of the method, if the one or more priorities for the present subsection comprise a priority of the nominal surface over the nominal layer thickness, a height-adjustment of the screed is calculated that ensures that a surface of the paved road surface material layer meets the provisions of the construction design data with respect to the nominal surface, even if a layer thickness of the paved road surface material layer falls below the nominal layer thickness.

According to another embodiment of the method, if the one or more priorities for the present subsection comprise a priority of the nominal layer thickness over the nominal surface, a height-adjustment of the screed is calculated that ensures that a layer thickness of the paved road surface material layer meets the provisions of the construction design data with respect to the nominal layer thickness even if a surface of the paved road surface material layer deviates from the nominal surface.

According to another embodiment of the method, the screed is tiltable, for instance at least about an axis defined by the paver's travelling direction along the path, the position data indicates a current 3D position of the screed, for instance in six degrees-of-freedom, and the thickness data indicates a current layer thickness of the paved road surface material layer at two or more positions. In particular, the thickness data may be received continuously from two or more thickness sensors simultaneously.

According to another embodiment, the method comprises
storing thickness data for at least a subset of positions of the screed along the path;
calculating from at least a subset of the stored thickness data a mean or average thickness value for the last part of the travelled path; and
using the mean or average thickness value as the current thickness value for calculating the height-adjustment.

In a particular embodiment, said last part of the travelled path is a distance corresponding to at least a length of the paver. In another particular embodiment, the stored thickness data of at least the last five metres of the travelled path is used for calculating the mean or average thickness value.

According to another embodiment of the method, in at least one of the subsections the construction process comprises connecting a surface of the paved road surface material layer to an existing road surface, and the priorities for this subsection comprise a priority of the nominal surface over the nominal layer thickness.

According to another embodiment, the method comprises
using a position sensor for continuously detecting the current position of the screed and for generating the position data, particularly wherein the position sensor comprises at least one of a GNSS antenna and a surveying instrument; and
using one or more thickness sensors provided on the paver for continuously detecting the current layer thickness and for generating the thickness data.

In a particular embodiment, calculating the height-adjustment and generating the control data is performed in a computing unit comprising at least one processor.

According to one embodiment of the method, adjusting the height of the screed comprises adjusting a height of a frame of the paver together with the screed. According to another embodiment, adjusting the height of the screed comprises adjusting a height of the screed relative to the frame.

A second aspect pertains to a system for automatically controlling a construction process of a section of a road, said section comprising a plurality of subsections, the construction process comprising paving a road surface material layer using a paver with a height-adjustable screed, the paver travelling along a pre-defined path. The system comprises a computing unit comprising at least one processor, wherein the computing unit is configured
to receive, from a design database, construction design data comprising information about the path and about a nominal surface and a nominal layer thickness of the paved road surface material layer for a multitude of positions along the path, the multitude of positions comprising at least one position in each of the subsections;
to receive, from a rules database, a set of rules comprising different priorities for each of the plurality of subsections, wherein the different priorities comprise at least one of a priority of the nominal surface over the nominal layer thickness and a priority of the nominal layer thickness over the nominal surface;
to continuously receive, from a position sensor, position data indicating a current position of the screed, including indicating a position of the screed in a present subsection of the plurality of subsections;
to continuously receive, from one or more thickness sensors positioned at the paver, thickness data indicating a current layer thickness of the paved road surface material layer;
to calculate, based on the road construction design data for the current position, on the current layer thickness and on one or more priorities for the present subsection, a height-adjustment of the screed;
to generate, based on the calculation, control data to adjust a height of the screed; and
to provide the control data to a machine control unit of the paver.

According to one embodiment, the system further comprises
the position sensor, for instance comprising a GNSS antenna;
the one or more thickness sensors, for instance comprising at least one ultrasound sensor; and/or
the design database and/or the rules database, for instance wherein the system comprises a data storage unit, the design database and/or the rules database being stored in the data storage unit.

According to another embodiment, the system further comprises a user interface comprising a display unit for providing the construction design data, the set of rules, the position data and/or the thickness data to a user.

In one embodiment, said user interface is configured to enable the user to adapt the set of rules. In another embodiment, the user interface is configured to provide a presentation on the display comprising information about
at least the current layer thickness and the nominal layer thickness for the current position,
a deviation of at least the current layer thickness and the nominal layer thickness for the current position from the construction design data, and/or
a deviation of a position and or heading of the paver from the path.

According to another embodiment, the system further comprises one or more wireless communication modules configured to enable wireless data transmission between the computing unit and at least one of the design database, the rules database, the position sensor, the one or more thickness sensors and the machine control unit.

A third aspect pertains to a paver comprising a height-adjustable screed configured for paving a road surface material layer as a part of a construction process of a section of a road while travelling along a pre-defined path. The paver comprises a frame to which the screed is attached, one or more tracks or wheels attached to the frame and configured to enable the paver to move along the path, and a machine control system. Said machine control system comprises one or more screed height control motors configured to adapt a height of the screed, one or more drive motors configured to drive the tracks or wheels, and a machine control unit configured to control the one or more screed height control motors and the one or more track motors. According to this aspect, the paver comprises one or more thickness sensors configured to continuously measure a current layer thickness of the paved road surface material layer while the paver travels along the path, and to continuously generate thickness data indicating the current layer thickness, and a system according to the second aspect.

A third aspect pertains to a computer programme product comprising programme code which is stored on a machine-readable medium, or being embodied by an electromagnetic wave comprising a programme code segment, having computer-executable instructions for performing the method according to the first aspect, in particular when run on a computing unit of a system according to the second aspect.

The method according to the first aspect may be performed using the system according to the second aspect, and the system according to the second aspect may be designed to perform the method according to the first aspect. The paver according to the third aspect may be designed to be operated using the method according to the first aspect.

The use of the system and method are not restricted to the building of roads but can as well be used for other, road-like structures, such as airport runways, racetracks or boardwalks.

BRIEF DESCRIPTION OF THE DRAWINGS

Aspects will be described in detail by referring to exemplary embodiments that are accompanied by figures, in which.

DETAILED DESCRIPTION

Figure 1:
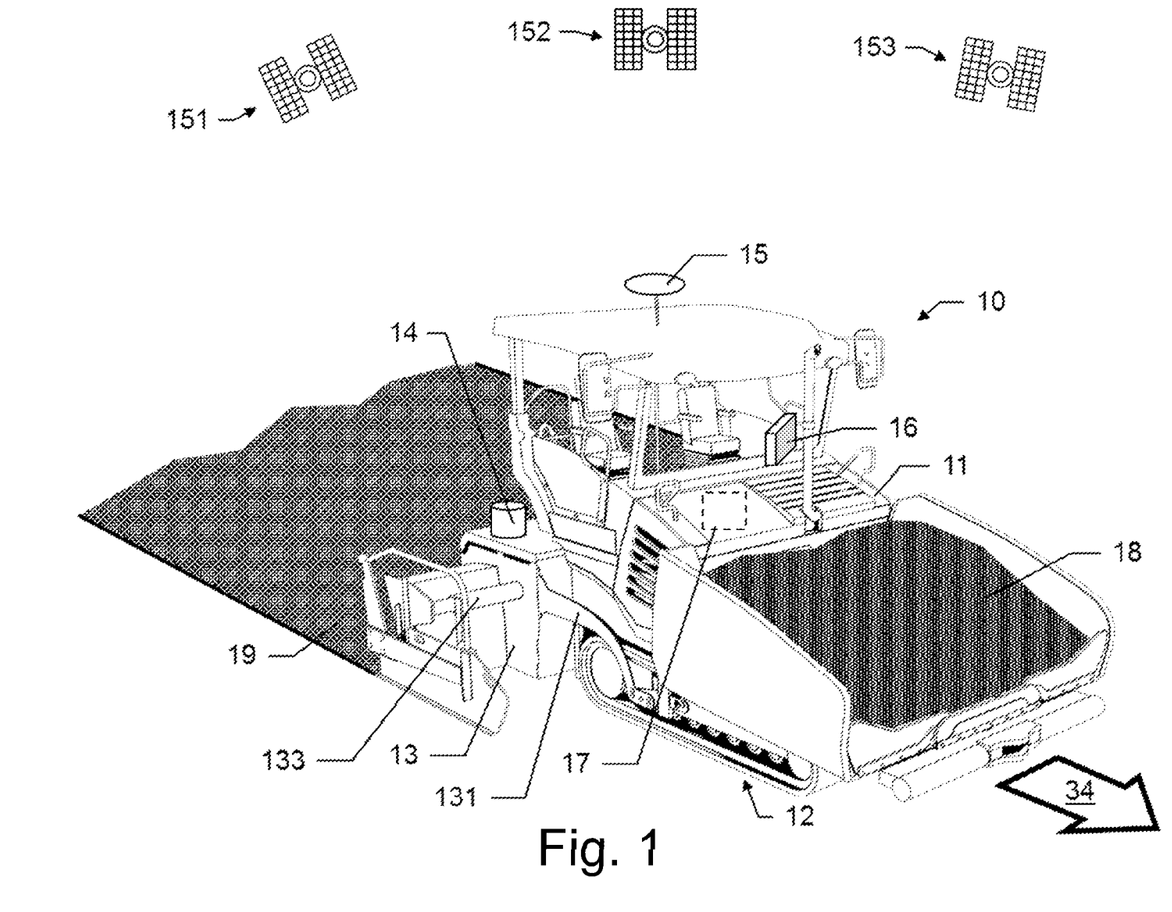
FIG. 1 shows a first exemplary embodiment of a paver comprising an exemplary embodiment of a system.
Figure 2:
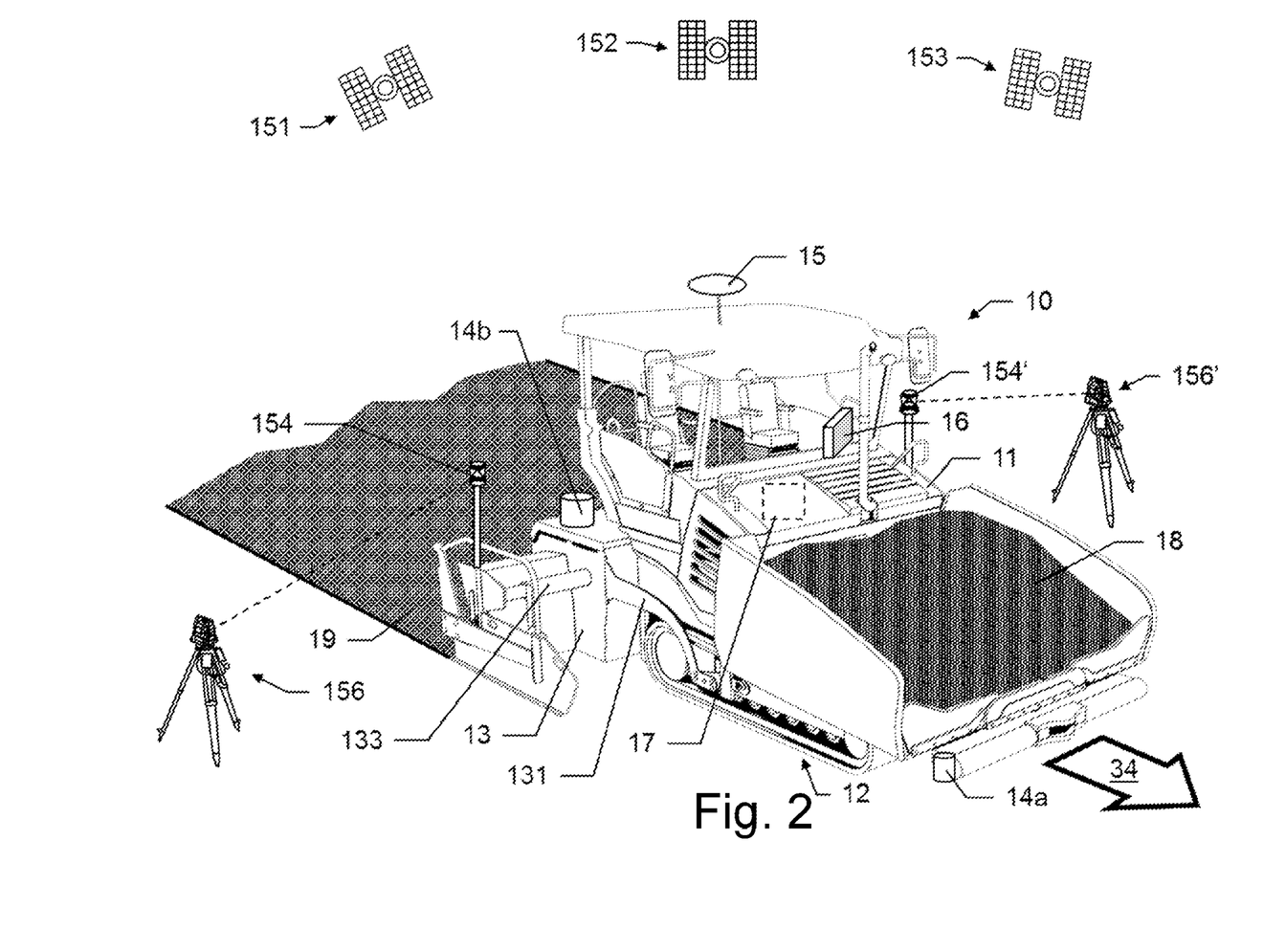
FIG. 2 shows a second exemplary embodiment of a paver comprising an exemplary embodiment of a system.

FIGS. 1 and 2 each show an exemplary embodiment of an asphalt paver 10 performing a paving task in the construction of a road along a predetermined path (indicated by the arrow 34).

The asphalt paver 10 shown in FIG. 1 comprises a body 11 and a working part in the form of a height-adjustable floating screed 13, which is arranged at the rear end of the paver 10 and fixed to the body 11 via a towing arm. A supply of asphalt material 18 is provided on the paver 10 and distributed by an auger system along the entire width of the screed 13. While the asphalt paver 10 advances along the path 34 over a prepared base surface, the screed 13 planes and compacts the distributed asphalt material 18 in order to provide a continuous asphalt surface 19 having a desired surface profile. The positioning of the screed 13 at a desired height is effected by means of a movement of two carriers 131 which are arranged pivotably on both sides of the paver 10. A width of the screed 13 may be extendable to both sides of the paver by means of two pistons 133. This allows construction of roads having different widths. For instance, the width of the screed 13 may be extended from the width of the paver 10 (e.g. 2.5 m) to e.g. 5 m, 7.5 m or 10 m.

A pair of tracks 12 (or alternatively a set of wheels) is attached to the frame 11 to allow motorized movement of the paver 10 along the path 34. The paver comprises a machine control unit 17 for controlling a movement of the tracks 12 as well as for controlling a position and orientation of the screed 13, i.e. at least its height above the ground, e.g. by adjusting a pivot angle of the carriers 131. A typical speed of a paver 10 during operation is about 3 to 4 metres per minute.

Since the paver 10 is required to produce the direction and height of the predetermined path 34 with maximum accuracy, correspondingly precise control thereof is required. In order to control the paver 10 with sufficient accuracy, a position sensor 15 is required, e.g. comprising one or more GNSS antennas in connection with satellites 151, 152, 153 of a global navigation satellite system (GNSS), such as, e.g. GPS.

The position sensor—in the shown embodiment the GNSS antenna 15—provides the determined position data to a computing unit 16 of the paver 10. The computing unit 16 has access to design data for the road to be constructed, e.g. comprising at least a required material thickness and a nominal surface position of the completed road. These data may be used to calculate a deviation of a current screed or paver position from design for each position along the path 34. The data may also be used to calculate a necessary height of the screed 13.

One or more thickness sensors 14 may be provided at the paver 10, the thickness sensor being configured to measure a thickness of the layer of the road surface material after it has been paved by the screed 13. The thickness sensor 14 for instance can comprise an ultrasonic sensor, an electromagnetic sensor or a scanning device. The thickness sensor 14 may continuously measure the thickness of the road surface material and continuously provide measured data to the computing unit 16. This allows a continuous quality control regarding the layer thickness of the constructed road.

In the shown embodiment of the paver 10, the height of the screed 13 is adjusted relative to the frame 11, i.e. a height of the frame 11 needs not be changed when the height of the screed 13 is adjusted. Alternatively or additionally, the height of the frame 11 may be adjustable, so that a height of the screed 13 can be adjusted by adjusting a height of the frame 11 together with the screed 13.

In some embodiments of the paver 10, the screed 13 is also adjustable about the roll axis, i.e. tiltable, about the axis defined by the paver's travelling direction 34. This allows adjusting the slope of the road surface 19. A component of the position sensor, for instance a tilt or cross slope sensor, may then indicate an attitude of the screed 13, so that the position data may comprise a current 3D position of the screed 13, in up to six degrees-of-freedom (6DOF). To allow automatic adjustment of the screed's tilt, in response to the thickness data, preferably two or more thickness sensors 14 are provided to indicate a current layer thickness at two or more positions simultaneously.

The position sensor means may be embodied as a single GNSS antenna system (as shown in FIG. 1) or a dual GNSS antenna system (i.e. having two GNSS antennas). For higher accuracy, a single or dual terrestrial positioning system (TPS), i.e. comprising one or two surveying instruments, or a combination of GNSS and TPS can be used.

The latter is illustrated in FIG. 2, where, in addition to the GNSS antenna 15, as further position sensor means the asphalt paver comprises two position indicators 154, 154' comprising reflectors or prisms that are firmly mounted by means of retaining elements on the screed 13. Alternatively or additionally, position indicators 154, 154' may be mounted to the frame 11—either directly or by means of retaining elements.

These position indicators 154, 154' can be monitored by means of one or more total station 156, 156' or similar surveying instruments 156, 156' (e.g. tacheometers or laser trackers) arranged on the ground. These follow the prisms 154, 154' by means of an optical system which can be oriented in all directions. The positions of the prisms are calculated from the solid angle of the optical system, the distance between prism and optical system and the position of the total station 156, 156'. For a comparison with a desired travel path, the positions and/or directions along the desired travel path must be present as required values for the paver 10 at the point at which the prism 154, 154' is arranged. In order to ensure a desired processing path of the working part, the behaviour of the paver 10 in curves should be taken into account in the determination of the required path for the prism 154, 154' so that the screed 13 moves along the desired path 34. The travel direction can be determined from successive positions. A derived position of the paver 10 is compared with a predetermined theoretical position of the paver 10, and the tracks 12 (or wheels) are correspondingly controlled.

In order to be able to derive a working height which is as accurate as possible from the positional height of a prism 155, 155', at least one value of at least one reference determination should be used for calculating the working height in the case of the screed 13.

The total station 156, 156' is connected to the computing unit 16, e.g. by means of a radio link, for evaluating the position information of the position element—in this case of the prism 154, 154'—and for providing control signals for controlling the paver 10 and the height adjustment of the screed 13.

In some embodiments, the thickness sensor 14 comprises two separate sensors 14a, 14b that are used to measure the thickness indirectly, i.e. by measuring a distance to the ground before and after the road surface material has been distributed. This is depicted in FIG. 2. For instance, a first sensor 14a at the front end of the paver 10 measures a distance to the ground before the road surface material has been distributed, a second sensor 14b at the rear end of the paver 10 measures a distance to the surface of the paved road surface material, and the two distance values are compared in real time to determine the thickness of the material. The thickness sensor may comprise a computing unit to calculate the thickness value from the values provided by the sensors 14a, 14b. Alternatively, one of the two sensors may be provided on a separate vehicle, e.g. an unmanned aerial vehicle (UAV).

Figure 3:
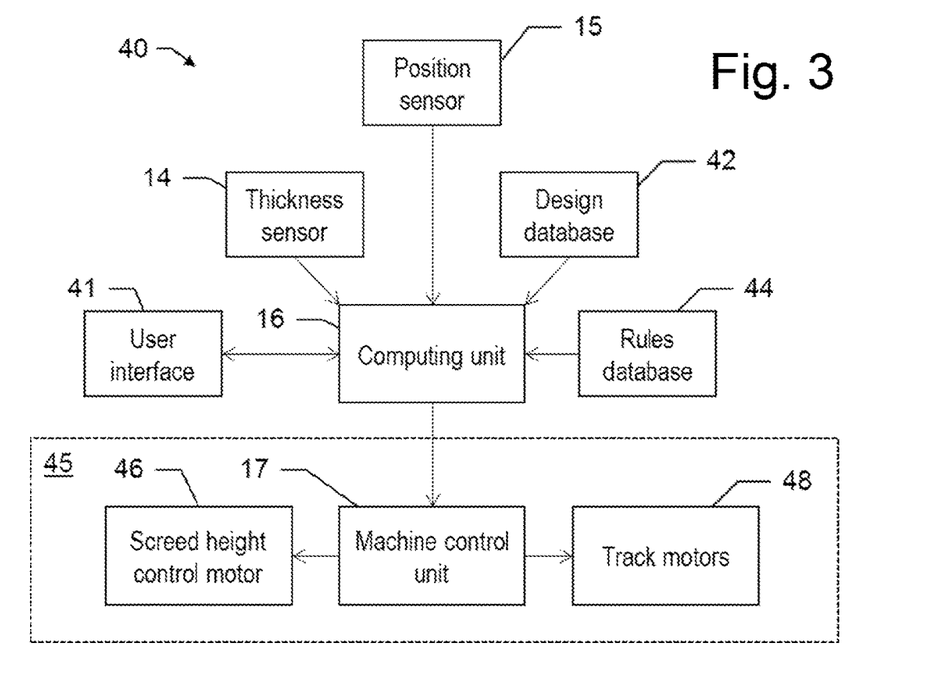
FIG. 3 illustrates the data flow in an exemplary embodiment of a system.

FIG. 3 illustrates an exemplary embodiment of a system 40 configured for controlling a layer thickness in a construction process of a road. A central unit of the system 40 is the computing unit 16, which receives data from the thickness sensor 14 and the position sensor 15. The computing unit 16 has also access to data from a design database 42 and a rules database 44.

The design database 42 provides nominal values for the road to be constructed, including two-dimensional coordinates such as route and a width of the road. The nominal values also may include three-dimensional coordinates for the surface of the road, i.e. its height and slope. Additionally, the nominal values comprise a nominal layer thickness for the road surface material (e.g. comprising asphalt and/or concrete material). The nominal values can be the same for the complete road or different for a number of sections.

The rules database 44 comprises a set of rules that need to be followed, e.g. if the nominal values allow more than one possibility or if two or more nominal values contradict each other.

Using the nominal data from the design database 42 and the rules from the rules database 44, an optimization algorithm and a processor of the computing unit 16 perform optimization calculations in real time based on the continuously received data from the thickness sensor 14 and the position sensor 15. In particular, the optimization comprises adapting a height of a screed of the paver in response to a measured layer thickness. Rules from the rules database 44 are used for determining reasons and tolerances for deviating from design, i.e. from the nominal data.

A command corresponding to the calculated adaptation is sent to a machine control unit 17 of the paver's built-in control system 45. The machine control unit 17 triggers the screed height control motors 46 to raise, lower or tilt the screed in accordance with the received command. At the same time, particularly continuously, the machine control unit 17 triggers the track motors 48 to actuate the tracks forward to move the paver further along the path, paving the material with the adapted screed height.

In some embodiments, the system 40 comprises a user interface 41. The computing unit 16 may send data from the thickness sensor 14, the position sensor 15, the design database 42 and/or the rules database 44 to said user interface 41 for presenting the data to a human operator, e.g. an operator of the paver or a supervisor of the construction process, on a display unit of the user interface 41. In particular, the operator is presented the layer thickness as measured in comparison to the target thickness from the design database for the present position. Optionally, the user may adapt the rules in the rules database 44 or override the rules manually by sending commands via the user interface 41 to the computing unit 16.

The structure of a floating screed may reduce the speed with which the height of the screed is adjustable. Depending on the design of the paver, the size of the screed, the used asphalt material and the desired height different, it could take over a paver length moving forward to effectively adjust the floating screed to a desired height. The paver might have travelled as far as five metres during this time, and the needed layer thickness may not be met at this portion of the road. Consequently, preferably, the computing unit 16 may be configured to continuously monitor the thickness data to determine a tendency of a falling or raising layer thickness and to calculate a forecast based thereon, wherein the forecast predicts a necessity to adjust the screed before the layer thickness actually exceeds one of the defined thresholds. A command to continuously adjust the height of the screed can then be sent to the machine control unit 17 in response to the calculated forecast.

Figure 4:
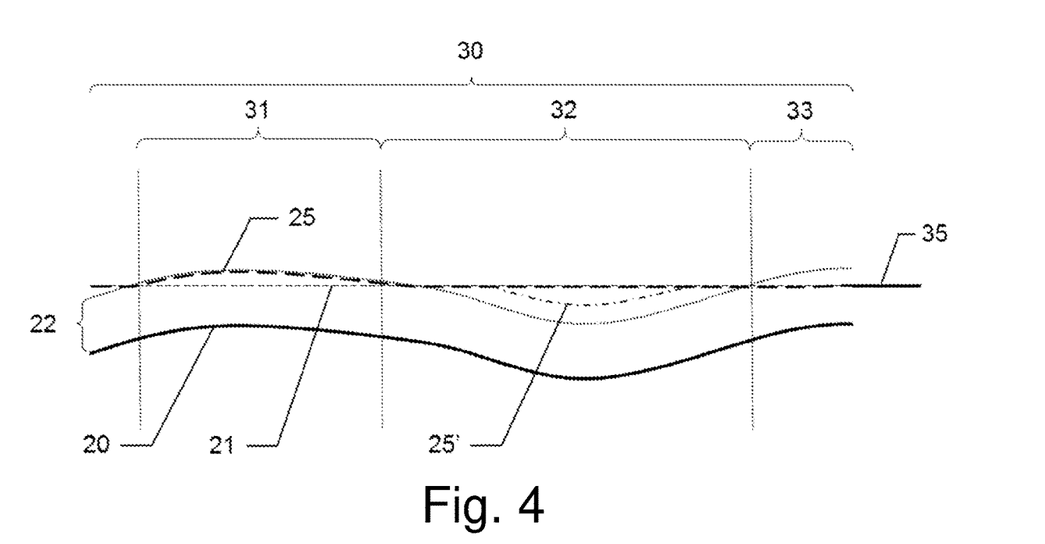
FIG. 4 shows a profile of a section of a road to be constructed with three subsections.

FIG. 4 illustrates a section 30 of a road to be constructed, the section comprising three subsections 31, 32, 33. For instance, the construction will start on the left end and proceed towards the right end, where the road is to be connected with an existing road and its surface 35.

The solid line on the bottom shows the solid ground 20. The dashed line shows the road surface 21 according to design. For reasons of simplicity it is horizontal over the complete course of the road section 30. A minimum layer thickness 22 has to be maintained at all times. This is indicated by the dotted line that is parallel to the solid ground line. If different layer thicknesses are to be applied in the course of the road, e.g. a larger thickness in the first subsection 31 than in the second subsection 32, the respective values can be provided in the design data to be used by the control system. Alternatively, the layer thickness in relation to a location may be provided in a separate file.

In principle, both, the road surface design line 21 and the minimum layer thickness 22 need to be followed when the road is constructed. This results in a road surface 25 indicated by the bold dashed line. Simplified, the road surface line 25 follows the design line 21 unless the minimum layer thickness line is higher.

In the first subsection 31, the solid ground 20 is too close to the design line 21, so that the required layer thickness 22 would not be met if the road would be built according to the 3D design represented by design line 21. For this case, a rules database may comprise the rule that the minimum layer thickness 22 is more important than the design (or vice versa). Depending on the project or the present road section, either the layer thickness 22 or the 3D height according to the design 21 can be more important and should thus be prioritized. For instance, the importance of closely observing a minimum layer thickness, among other factors, depends on a nature and condition of the ground 20. Thus, if the ground 20 is not very stable in a section (or subsection) of the planned road, the layer thickness 22 should be prioritized there over the 3D height of the design line 21. In the shown example, in the first subsection 31, the layer thickness 22 is prioritized over the design 21. Consequently, here the built road surface 25 deviates from the design line 21 in order to ensure the required layer thickness 22.

In the second subsection 32, the solid ground 20 is further away from the design line 21 so that there is no problem with meeting the minimum layer thickness 22. The road surface 25 in this subsection 32 could thus be built according to design without violating the minimum layer thickness requirements. However, a large amount of asphalt material would be needed to build the road according to design. For this case, the rules database may comprise the rule to slightly deviate from the design line 21 in order to reduce the amount of material needed. This is indicated by line 25'. Thresholds for an acceptable deviation from the design line 21 and when to apply them may be provided as rules in the rules database. If aspects are present that require accurately following the design line 21 in this section—or at least not falling below the 3D height of the design—these aspects will be taken into consideration in the rules database.

The third subsection 33 ends in a connection with an existing road surface 35, for instance a surface of a previously finished road section, of an existing bridge or of a roundabout traffic. In this section, it is necessary to form a smooth transition between the existing road surface 35 and the built road surface 25. This aspect is considered in the rules database. Consequently, the design line 21 is prioritized so that even if the layer thickness falls below the minimum layer thickness 22, the built road surface 25 follows the design line 21 in this subsection 33.

Figure 5:
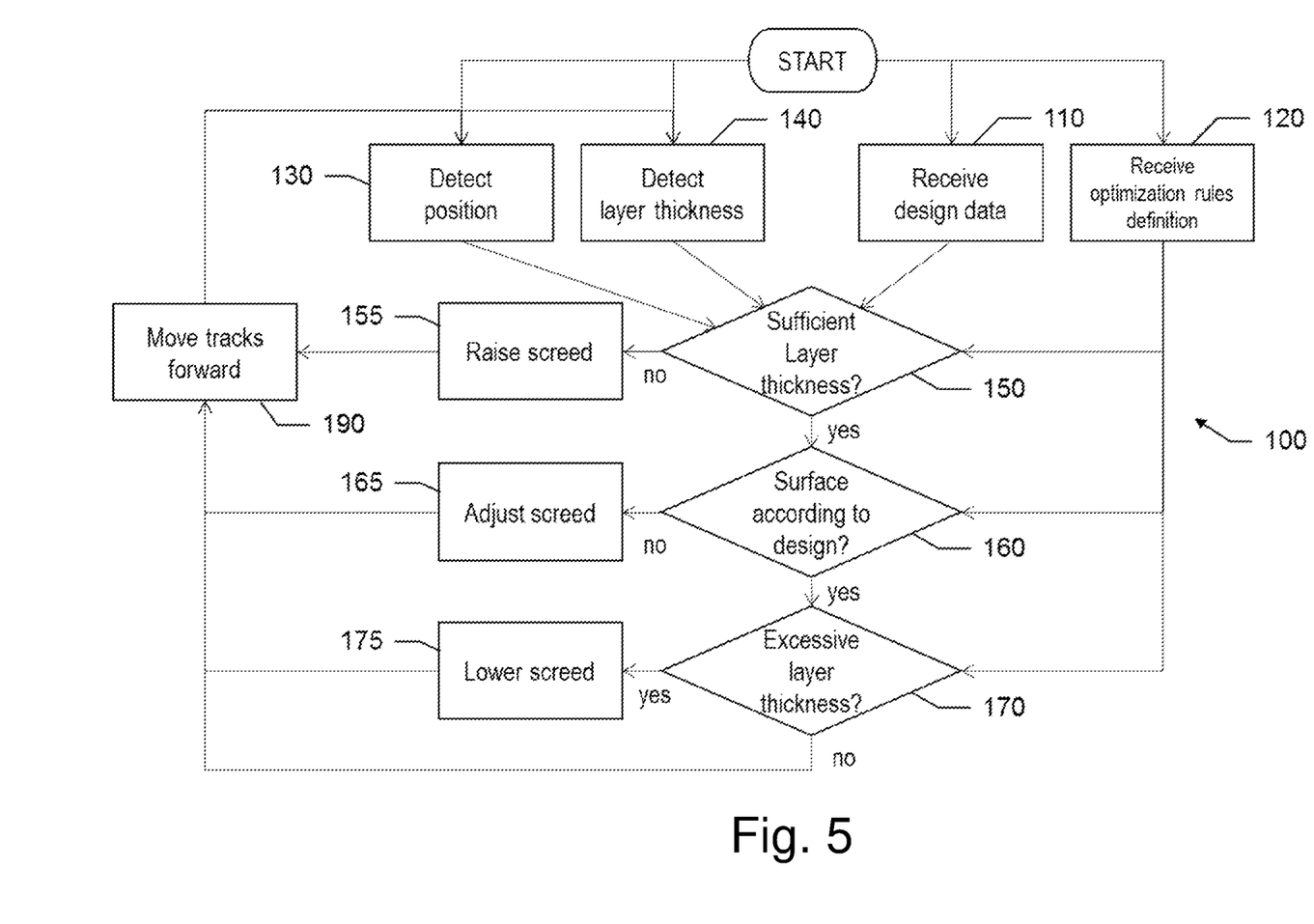
FIG. 5 shows a flowchart illustrating a first exemplary embodiment of a method.

FIG. 5 shows a flowchart illustrating a first exemplary embodiment of a computer-implemented method 100.

After the start of the method, a computing unit receives design data 110 from a design database, the design data comprising nominal values for the construction of a road, for instance including information about a nominal surface and a nominal layer thickness of the road surface material layer for a multitude of positions.

A position sensor then continuously determines 130 a position of a screed, and the computing unit continuously receives position data indicating the current position. At the same time, a thickness sensor continuously determines 140 a layer thickness of the road surface material layer, and the computing unit continuously receives thickness data indicating the actual values of a current layer thickness.

Based on the received design data and the continuously received thickness data, the computing unit performs a first target-performance comparison 150 to determine whether the actual layer thickness is sufficient. If it is not sufficient, a command is issued to raise the screed 155 in order to increase the layer thickness. The tracks are continuously moved forward 190 and the method continues with continuously detecting position 130 and layer thickness 140.

If the first target-performance comparison 150 shows that the actual layer thickness is sufficient, based on the received position data and the continuously received thickness data, the computing unit performs a second target-performance comparison 160 to determine whether the layer thickness is so that the surface of the road is according to design. If the road surface is not according to design, i.e. exceeds a pre-determined threshold, a command is issued to adjust the screed 165, i.e. to raise or lower the screed, in order to meet the design. The tracks are actuated to continuously move the paver forward 190 and the method continues with continuously detecting position 130 and layer thickness 140.

If the second target-performance comparison 160 shows that surface of the road is according to design, based on the continuously received thickness data, the computing unit determines 170 whether the actual layer thickness exceeds a pre-determined threshold. If this is the case, then a command is issued to lower the screed 175 to reduce the amount of material. The tracks are actuated to continuously move the paver forward 190 and the method continues with continuously detecting position 130 and layer thickness 140 until the road is finished.

Preferably, the thickness data should be monitored continuously to determine a tendency of a falling or raising layer thickness, so that a necessity to adjust the screed can be predicted before the layer thickness actually exceeds one of the defined thresholds. The height of the screed can then be adjusted 155, 165, 175 continuously in response to the received data and a calculated forecast.

Figure 6:
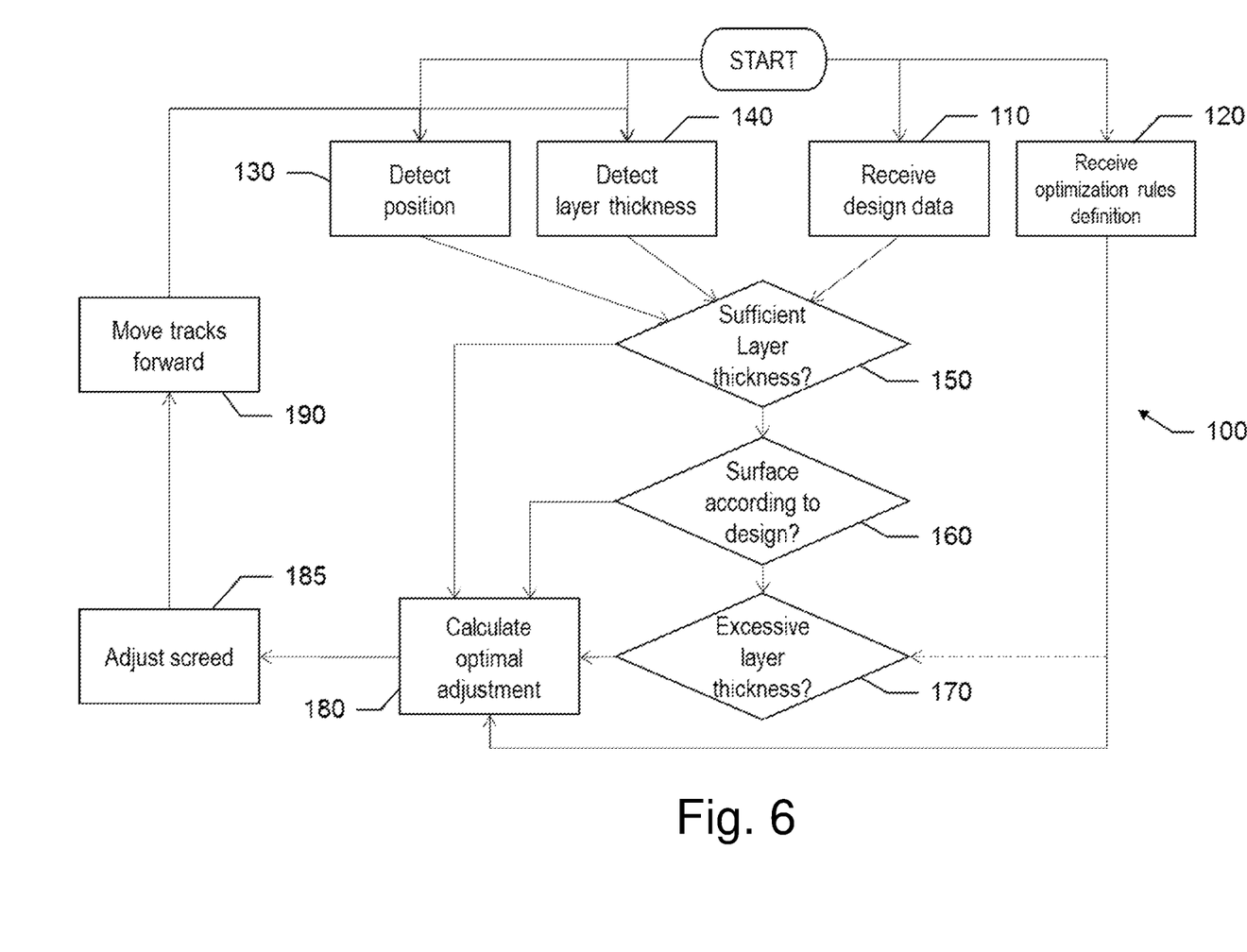
FIG. 6 shows a flowchart illustrating a second exemplary embodiment of a method.

FIG. 6 shows a flowchart illustrating a second exemplary embodiment of a computer-implemented method 100.

After the start of the method, a computing unit receives design data 110 from a design database, the design data comprising nominal values for the construction of a road, for instance including information about a nominal surface and a nominal layer thickness of the road surface material layer for a multitude of positions. The computing unit also receives an optimization rules definition 120 from a rules database.

A position sensor then continuously determines 130 a position of a screed, and the computing unit continuously receives position data indicating the current position. At the same time, a thickness sensor continuously determines 140 a layer thickness of the road surface material layer, and the computing unit continuously receives thickness data indicating the actual values of a current layer thickness.

Based on the received design data and the continuously received thickness data, the computing unit performs a number of evaluations 150, 160, 170—either subsequently or simultaneously. These evaluations comprise a first target-performance comparison 150 to determine whether the actual layer thickness is sufficient, a second target-performance comparison 160 to determine whether the layer thickness is so that the surface of the road is according to design, and an evaluation to determine 170 whether the actual layer thickness exceeds a pre-determined threshold. Said threshold can be provided as part of the optimization rules definition 120 from the rules database.

Based on these evaluations 150, 160, 170 and in consideration of the optimization rules definition 120 received from the rules database, an optimal adjustment for the screed is calculated 180 in the computing unit, e.g. using a processor and an optimization algorithm of the computing unit. A command is issued to adjust the screed 185, i.e. to raise or lower the screed, according to the calculated optimization. The tracks are continuously moved forward 190 and the method continues with continuously detecting position 130 and layer thickness 140.

The optimization rules definition 120 received from the rules database comprises a set of rules that can be user-defined for each project according to the user's needs or preferences.

Especially in the case of a conflict of objectives given by the design, these rules are necessary to define how to proceed without the need for an intervention or decision by a human user.

One objective may be that falling below a defined minimum layer thickness must be avoided in order to meet specifications given by the design, e.g. specifications received from a customer.

A second objective may be that a 3D height of the road surface needs to be according to design.

A third objective may be that exceeding a required layer thickness by a certain percentage or absolute value is tolerated but should be minimized because this would lead to additional material consumption, and thus cost for the contractor.

The rules may then define that one of the objectives, e.g. the 3D height, is prioritized. Subordinate to this the layer thickness measurement would determine any additional or reduced consumption compared to the plan in the installation, which in turn can be used for an intelligent control of the material logistics and thus contribute to a reduction of material consumption. Alternatively, a sufficient layer thickness can be the top priority, wherein a 3D height can optionally be used for steering and controlling the working width. For instance, different target values for the layer thickness on the left side, on the right side and in the middle of the road can be provided by the design data.

The deviation from a required layer thickness can be monitored continuously. Conventionally, if the tolerance specifications are exceeded, the paver would be stopped by the system in order to prevent further incorrect paving. Since every stop of an asphalt paver risks a loss of quality for the road surface, paving stops should be avoided.

Thus, if the measured layer thickness continuously drops or grows, countermeasures should be taken early, e.g. by continuously adjusting the paving thickness in small steps. In order to achieve necessary flatness of the road surface (e.g. a maximum height deviation of 2 millimetres on a 4 metre road section) and also to prevent the screed from (over-)swinging, the operating system may save the layer thickness values over a distance and calculate an average for it. This distance and the mean value calculated therefrom depend on the paving speed and the layer thickness. Both parameters have an influence on the inertia of the adjustment of the screed. For instance, the distance may be between 5 and 20 metres.

The operator may be given the choice between prioritization of either design height or layer thickness or a combination of both. If the operator chooses the combination the prioritization changes automatically depending on road specifics and on a set of pre-defined rules. For instance, in front of a bridge, an exit or round-about, the absolute match of a required surface height has priority before layer thickness, but after leaving the "fixed point", layer thickness gets priority back. Another choice could be that the operator overrules the rules in the data base.

Although aspects are illustrated above, partly with reference to some preferred embodiments, it must be understood that numerous modifications and combinations of different features of the embodiments can be made. All of these modifications lie within the scope of the appended claims.

The invention claimed is:

1. A computer-implemented method for automatically controlling a construction process of a section of a road, the section comprising a plurality of subsections, the construction process comprising processing a road surface material layer comprising concrete or asphalt material using a paver with a height-adjustable screed, the paver travelling along a predetermined path, the method comprising:
   receiving construction design data comprising information about the path and about a nominal surface and a nominal layer thickness of the paved road surface material layer for a multitude of positions along the path, the multitude of positions comprising at least one position in each of the subsections;
   receiving a set of rules comprising different priorities for each of the plurality of subsections, wherein the different priorities comprise at least:
      a priority of the nominal surface over the nominal layer thickness, and/or
      a priority of the nominal layer thickness over the nominal surface;
   continuously receiving position data indicating a current position of the screed, including indicating a position of the screed in a present subsection of the plurality of subsections;
   continuously receiving thickness data indicating a current layer thickness of the paved road surface material layer;
   calculating, based on the road construction design data for the current position, on the current layer thickness and on one or more priorities for the present subsection, a height-adjustment of the screed;
   generating, based on the calculation, control data to adjust a height of the screed; and
   providing the control data to a machine control unit of the paver.

2. The method according to claim 1, wherein
   the set of rules comprises one or more deviation rules related to a deviation of the paved road surface material layer from the nominal surface and/or from the nominal layer thickness, and
   the deviation rules at least define requirements for an allowed deviation and a maximum extent of the deviation,
   wherein the deviation rules comprise one or more thresholds related to a maximum layer thickness of the paved road surface material layer as requirements for an allowed deviation.

3. The method according to claim 1, wherein, if the one or more priorities for the present subsection comprise a priority of the nominal surface over the nominal layer thickness, a height-adjustment of the screed is calculated that ensures that a surface of the paved road surface material layer meets the provisions of the construction design data with respect to the nominal surface, even if a layer thickness of the paved road surface material layer falls below the nominal layer thickness.

4. The method according to claim 1, wherein, if the one or more priorities for the present subsection comprise a priority of the nominal layer thickness over the nominal surface, a height-adjustment of the screed is calculated that ensures that a layer thickness of the paved road surface material layer meets the provisions of the construction design data with respect to the nominal layer thickness even if a surface of the paved road surface material layer deviates from the nominal surface.

5. The method according to claim 1, wherein:
the screed is tiltable, particularly at least about an axis defined by the paver's travelling direction along the path,
the position data indicates a current three-dimensional position of the screed, particularly in six degrees-of-freedom, and
the thickness data indicates a current layer thickness of the paved road surface material layer at two or more positions, particularly wherein the thickness data is continuously received from two or more thickness sensors simultaneously.

6. The method according to claim 1, comprising:
storing thickness data for at least a subset of positions of the screed along the path;
calculating from at least a subset of the stored thickness data a mean or average thickness value for the last part of the travelled path; and
using the mean or average thickness value as the current thickness value for calculating the height-adjustment, wherein
the last part of the travelled path is a distance corresponding to at least a length of the paver, and/or
stored thickness data of at least the last five metres of the travelled path is used for calculating the mean or average thickness value.

7. The method according to claim 1, wherein, in at least one of the subsections, the construction process comprises connecting a surface of the paved road surface material layer to an existing road surface, and the priorities for this subsection comprise a priority of the nominal surface over the nominal layer thickness.

8. The method according to claim 1, comprising:
using a position sensor for continuously detecting the current position of the screed and for generating the position data, particularly wherein the position sensor comprises at least one of a GNSS antenna and a surveying instrument; and
using one or more thickness sensors provided on the paver for continuously detecting the current layer thickness and for generating the thickness data,
wherein calculating the height-adjustment and generating the control data is performed in a computing unit comprising at least one processor.

9. A computer program product comprising program code which is stored on a non-transitory machine-readable medium, or being embodied by an electromagnetic wave comprising a program code segment, having computer-executable instructions for performing, the method of claim 1.

10. The method according to claim 1, wherein adjusting the height of the screed comprises at least one of adjusting a height of a frame of the paver together with the screed, and adjusting a height of the screed relative to the frame.

11. A computer program product comprising program code which is stored on a non-transitory machine-readable medium, or being embodied by an electromagnetic wave comprising a program code segment, having computer-executable instructions for performing, the method of claim 10.

12. A system for automatically controlling a construction process of a section of a road, the section comprising a plurality of subsections, the construction process comprising paving a road surface material layer using a paver with a height-adjustable screed, the paver travelling along a pre-defined path, the system comprising a computing unit comprising at least one processor, the computing unit is configured:
to receive, from a design database, construction design data comprising information about the path and about a nominal surface and a nominal layer thickness of the paved road surface material layer for a multitude of positions along the path, the multitude of positions comprising at least one position in each of the subsections;
to receive, from a rules database, a set of rules comprising different priorities for each of the plurality of subsections, wherein the different priorities comprise at least a priority of the nominal surface over the nominal layer thickness, and/or
a priority of the nominal layer thickness over the nominal surface;
to continuously receive, from a position sensor, position data indicating a current position of the screed, including indicating a position of the screed in a present subsection of the plurality of subsections;
to continuously receive, from one or more thickness sensors positioned at the paver, thickness data indicating a current layer thickness of the paved road surface material layer;
to calculate, based on the road construction design data for the current position, on the current layer thickness and on one or more priorities for the present subsection, a height-adjustment of the screed;
to generate, based on the calculation, control data to adjust a height of the screed; and
to provide the control data to a machine control unit of the paver.

13. The system according to claim 12, further comprising one or more wireless communication modules configured to enable wireless data transmission between the computing unit and at least one of:
the design database,
the rules database,
the position sensor,
the one or more thickness sensors, and
the machine control unit.

14. A paver comprising a height-adjustable screed configured for paving a road surface material layer as a part of a construction process of a section of a road while travelling along a pre-defined path, the paver comprising:
a frame to which the screed is attached;
one or more tracks or wheels attached to the frame and configured to enable the paver to move along the path;
a machine control system comprising:
one or more screed height control motors configured to adapt a height of the screed,
one or more drive motors configured to drive the tracks or wheels,
a machine control unit configured to control the one or more screed height control motors and the one or more track motors,
one or more thickness sensors configured to continuously measure a current layer thickness of the paved road surface material layer while the paver travels along the path, and to continuously generate thickness data indicating the current layer thickness; and
the system according to claim 12.

15. A paver comprising a height-adjustable screed configured for paving a road surface material layer as a part of a construction process of a section of a road while travelling along a pre-defined path, the paver comprising:

a frame to which the screed is attached;
one or more tracks or wheels attached to the frame and configured to enable the paver to move along the path;
a machine control system comprising:
one or more screed height control motors configured to adapt a height of the screed,
one or more drive motors configured to drive the tracks or wheels,
a machine control unit configured to control the one or more screed height control motors and the one or more track motors,
one or more thickness sensors configured to continuously measure a current layer thickness of the paved road surface material layer while the paver travels along the path, and to continuously generate thickness data indicating the current layer thickness; and
the system according to claim 13.

16. The system according to claim 12, further comprising:
the position sensor, particularly comprising a GNSS antenna;
the one or more thickness sensors, particularly comprising an ultrasound sensor; and/or
the design database and/or the rules database, particularly wherein the system comprises a data storage unit, the design database and/or the rules database being stored in the data storage unit.

17. The system according to claim 16, further comprising a user interface comprising a display unit for providing the construction design data, the set of rules, the position data and/or the thickness data to a user, particularly wherein the user interface is configured:
to enable the user to adapt the set of rules; and/or
to provide a presentation on the display comprising information about:
at least the current layer thickness and the nominal layer thickness for the current position,
a deviation of at least the current layer thickness and the nominal layer thickness for the current position from the construction design data, and/or
a deviation of a position and or heading of the paver from the path.

18. The system according to claim 12, further comprising a user interface comprising a display unit for providing the construction design data, the set of rules, the position data and/or the thickness data to a user, particularly wherein the user interface is configured:
to enable the user to adapt the set of rules; and/or
to provide a presentation on the display comprising information about:
at least the current layer thickness and the nominal layer thickness for the current position,
a deviation of at least the current layer thickness and the nominal layer thickness for the current position from the construction design data, and/or
a deviation of a position and or heading of the paver from the path.

19. The system according to claim 18, further comprising one or more wireless communication modules configured to enable wireless data transmission between the computing unit and at least one of:
the design database,
the rules database,
the position sensor,
the one or more thickness sensors, and
the machine control unit.

\* \* \* \* \*